United States Patent
Chuong et al.

(10) Patent No.: US 10,697,550 B2
(45) Date of Patent: *Jun. 30, 2020

(54) NON-CONTACT SEAL WITH PROGRESSIVE RADIAL STOP(S)

(71) Applicant: United Technologies Corporation, Farmington, CT (US)

(72) Inventors: Conway Chuong, Manchester, CT (US); Ross Wilson, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,898

(22) Filed: Aug. 15, 2019

(65) Prior Publication Data

US 2019/0368615 A1    Dec. 5, 2019

Related U.S. Application Data

(63) Continuation of application No. 15/651,081, filed on Jul. 17, 2017, now Pat. No. 10,422,431.

(51) Int. Cl.
| | |
|---|---|
| *F16J 15/44* | (2006.01) |
| *F01D 11/02* | (2006.01) |
| *F01D 11/14* | (2006.01) |
| *F01D 5/03* | (2006.01) |
| *F02C 3/14* | (2006.01) |

(52) U.S. Cl.
CPC .............. *F16J 15/442* (2013.01); *F01D 5/03* (2013.01); *F01D 11/025* (2013.01); *F01D 11/14* (2013.01); *F02C 3/14* (2013.01); *F16J 15/441* (2013.01); *F16J 15/445* (2013.01); *F05D 2220/323* (2013.01); *F05D 2240/55* (2013.01)

(58) Field of Classification Search
CPC .......... F16J 15/44; F16J 15/441; F16J 15/442; F16J 15/445; F01D 5/03; F01D 11/025; F01D 11/14; F02C 3/14; F05D 2220/323; F05D 2240/55
See application file for complete search history.

(56) References Cited

U.S. PATENT DOCUMENTS

| | | | |
|---|---|---|---|
| 6,428,009 | B2 | 8/2002 | Justak |
| 7,182,345 | B2 | 2/2007 | Justak |
| 7,410,173 | B2 | 8/2008 | Justak |
| 7,816,625 | B2 | 10/2010 | Beck et al. |

(Continued)

FOREIGN PATENT DOCUMENTS

EP      0826457 A1    3/1998

*Primary Examiner* — Gilbert Y Lee
(74) *Attorney, Agent, or Firm* — Getz Balich LLC

(57) ABSTRACT

An assembly for rotational equipment includes a plurality of seal shoes, a seal base, a plurality of spring elements and a frangible element. The seal shoes are arranged around an axis in an annular array. The seal base circumscribes the annular array of the seal shoes. Each of the spring elements is radially between and connects a respective one of the seal shoes and the seal base. A first of the spring elements includes a first mount, a second mount and a spring beam. The first mount is connected to a first of the seal shoes. The second mount is connected to the seal base. The spring beam extends longitudinally between and connects the first mount and the second mount. The frangible element is configured to restrict radial outward movement of the first of the seal shoes.

20 Claims, 10 Drawing Sheets

(56) References Cited

U.S. PATENT DOCUMENTS

| | | |
|---|---|---|
| 7,896,352 B2 | 3/2011 | Justak |
| 8,002,285 B2 | 8/2011 | Justak |
| 8,172,232 B2 | 5/2012 | Justak |
| 9,434,025 B2 | 9/2016 | Elfizy et al. |
| 9,676,058 B2 | 6/2017 | Hu et al. |
| 2012/0223483 A1 | 9/2012 | Bidkar et al. |
| 2013/0234399 A1 | 9/2013 | Justak |
| 2014/0008871 A1 | 1/2014 | Bidkar et al. |
| 2014/0062024 A1 | 3/2014 | Bidkar et al. |
| 2014/0117624 A1 | 5/2014 | Bidkar et al. |
| 2014/0119912 A1 | 5/2014 | Bidkar et al. |
| 2016/0010480 A1 | 1/2016 | Bidkar et al. |
| 2016/0108750 A1 | 4/2016 | Wilson et al. |
| 2016/0115805 A1 | 4/2016 | Gibson et al. |
| 2016/0130963 A1 | 5/2016 | Wilson et al. |
| 2016/0263707 A1 | 9/2016 | Elfizy et al. |
| 2018/0058240 A1 | 3/2018 | Chuong et al. |

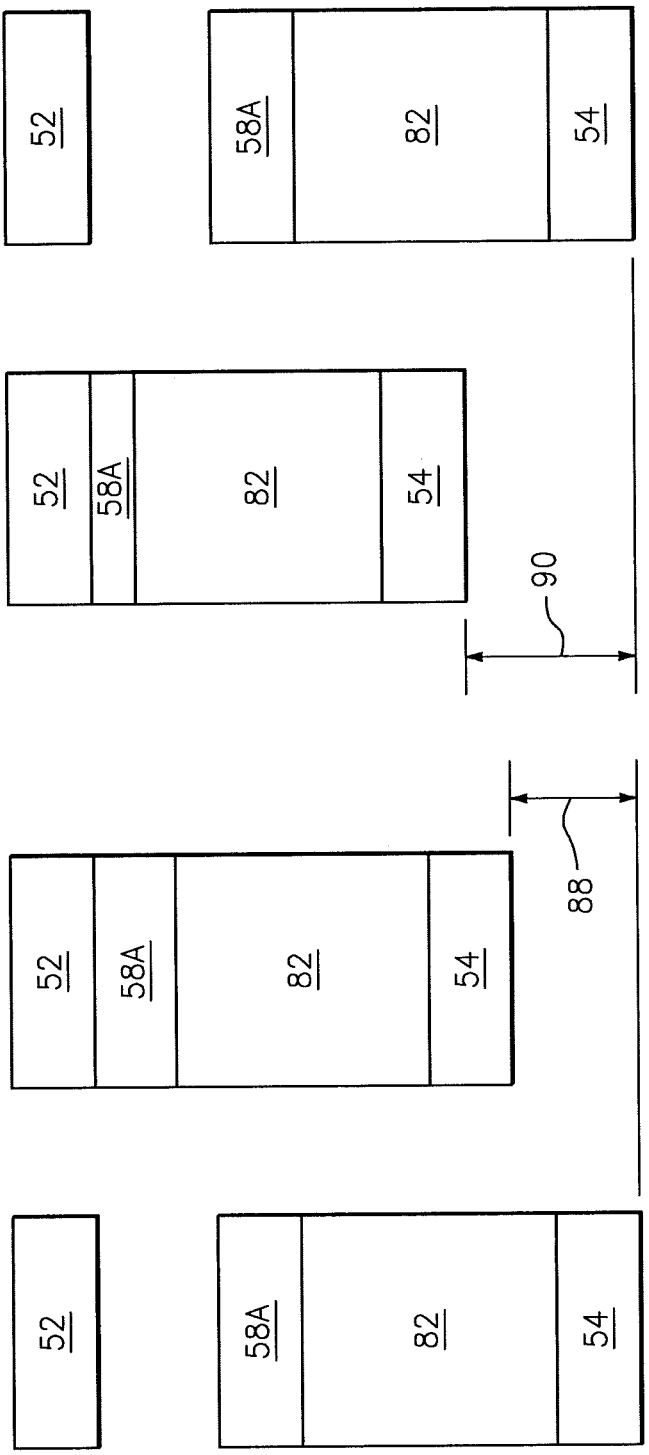

NON-CONTACT SEAL WITH PROGRESSIVE RADIAL STOP(S)

This invention was made with Government support awarded by the United States. The Government has certain rights in this invention.

This application claims priority to U.S. patent application Ser. No. 15/651,081 filed Jul. 17, 2017, which is hereby incorporated herein by reference in its entirety.

BACKGROUND

1. Technical Field

This disclosure relates generally to rotational equipment and, more particularly, to a non-contact seal assembly for rotational equipment.

2. Background Information

Rotational equipment such as a gas turbine engine typically includes a seal assembly for sealing an annular gap between a rotor and a stationary structure. Various types and configurations of seal assemblies are known in the art. While these known seal assemblies have various advantages, there is still room in the art for improvement.

SUMMARY OF THE DISCLOSURE

According to an aspect of the present disclosure, an assembly is provided for rotational equipment. This assembly includes a plurality of seal shoes, a seal base, a plurality of spring elements and a frangible element. The seal shoes are arranged around an axis in an annular array. Each of the spring elements is radially between and connects a respective one of the seal shoes and the seal base. A first of the spring elements includes a first mount, a second mount and a spring beam. The first mount is connected to a first of the seal shoes. The second mount is connected to the seal base. The spring beam extends longitudinally between and connects the first mount and the second mount. The frangible element is configured to restrict radial outward movement of the first of the seal shoes.

According to another aspect of the present disclosure, another assembly is provided for rotational equipment. This assembly includes a non-contact seal assembly. The non-contact seal assembly includes a plurality of seal shoes arranged around an axis, a seal base circumscribing the seal shoes, and a plurality of spring elements. Each of the spring elements is radially between and connects a respective one of the seal shoes and the seal base. A first of the spring elements includes a first mount, a second mount and a spring beam. The first mount is connected to a first of the seal shoes. The second mount is connected to the seal base. The spring beam extends longitudinally between and connects the first mount and the second mount. A stop element is radially between the seal base and the first of the seal shoes. The stop element is configured to enable a first magnitude of radial outward movement of the first of the seal shoes during a first mode of operation. The stop element is also configured to enable a second magnitude of radial outward movement of the first of the seal shoes during a second mode of operation, wherein the second magnitude is greater than the first magnitude.

According to still another aspect of the present disclosure, another assembly is provided for rotational equipment. This assembly includes a non-contact seal assembly. The non-contact seal assembly includes a plurality of seal shoes arranged around an axis, a seal base circumscribing the seal shoes, and a plurality of spring elements. Each of the spring elements is radially between and connects a respective one of the seal shoes and the seal base. A first of the spring elements includes a first mount, a second mount and a spring beam. The first mount is connected to a first of the seal shoes. The second mount is connected to the seal base. The spring beam extends longitudinally between and connects the first mount and the second mount. A stop element is radially between the seal base and the first of the seal shoes. The stop element is configured to have a nominal configuration during a first mode of operation, and an off-nominal configuration, which is different from the nominal configuration, during a second mode of operation.

The frangible element may be configured to progressively restrict the radial outward movement of the first of the seal shoes.

The frangible element may be adapted to enable a first magnitude of the radial outward movement of the first of the seal shoes during a first mode of operation. The frangible element may be adapted to enable a second magnitude of the radial outward movement of the first of the seal shoes during a second mode of operation. The second magnitude may be greater than the first magnitude.

The frangible element may be configured to have a nominal configuration during a first mode of operation. The frangible element may also be configured to have an off-nominal configuration, which is different from the nominal configuration, during a second mode of operation.

The off-nominal configuration may be a damaged configuration.

The off-nominal configuration may be a compressed configuration.

The frangible element may be configured such that is cannot return to the nominal configuration after being in the off-nominal configuration.

The assembly may also include a non-contact seal assembly, which may include the seal shoes, the seal base, the spring elements and the frangible element. The frangible element may be a replaceable component of the non-contact seal assembly.

The assembly may also include a non-contact seal assembly, which may include the seal shoes, the seal base, the spring elements and the frangible element. The frangible element may be brazed to another component of the non-contact seal assembly.

The frangible element may be configured as or otherwise include a porous body.

The frangible element may be connected to a first component, where the first component may be configured as or otherwise include the first mount or the second mount.

The frangible element may be operable to alternately radially engage and radially disengage a second component during nominal operation. The second component may be configured as or otherwise include the seal base where the first component is configured as or otherwise includes the first mount. Alternatively, the second component may be configured as or otherwise include the first of the seal shoes where the first component is configured as or otherwise includes the second mount.

The frangible element may be connected to a first component, where the first component may be configured as or otherwise include the seal base or the first of the seal shoes.

The frangible element may be operable to alternately radially engage and radially disengage a second component during nominal operation. The second component may be configured as or otherwise include the first mount where the first component is configured as or otherwise includes the seal base. The second component may be configured as or otherwise include the second mount where the first component is configured as or otherwise includes the first of the seal shoes.

The assembly may include a second frangible element configured to restrict radial outward movement of the first of the seal shoes. The second frangible element may be arranged radially between the second mount and the first of the seal shoes. The frangible element may be arranged radially between the first mount and the seal base.

The first of the spring elements may also include a second spring beam extending longitudinally between and connected to the first mount and the second mount.

The assembly may also include a ring structure axially engaged with the seal base. The assembly may also include a secondary seal device mounted with the ring structure. The secondary seal device may be configured to substantially seal an annular gap between the ring structure and the annular array of the seal shoes.

The assembly may include a stationary structure, a rotor structure and a non-contact seal assembly. The non-contact seal assembly may include the seal shoes, the seal base and the spring elements. The seal assembly may be configured to substantially seal an annular gap between the stationary structure and the rotor structure. The seal shoes may circumscribe and sealingly mate with the rotor structure. The seal base may be mounted to and radially within the stationary structure.

The foregoing features and the operation of the invention will become more apparent in light of the following description and the accompanying drawings.

BRIEF DESCRIPTION OF THE DRAWINGS

FIGS. 7A and 7B are block diagrams depicting movement of components of the primary seal device during a nominal mode of operation.

FIGS. 8A and 8B are block diagrams depicting movement of components of the primary seal device during an off-nominal mode of operation.

DETAILED DESCRIPTION OF THE INVENTION

Figure 1:
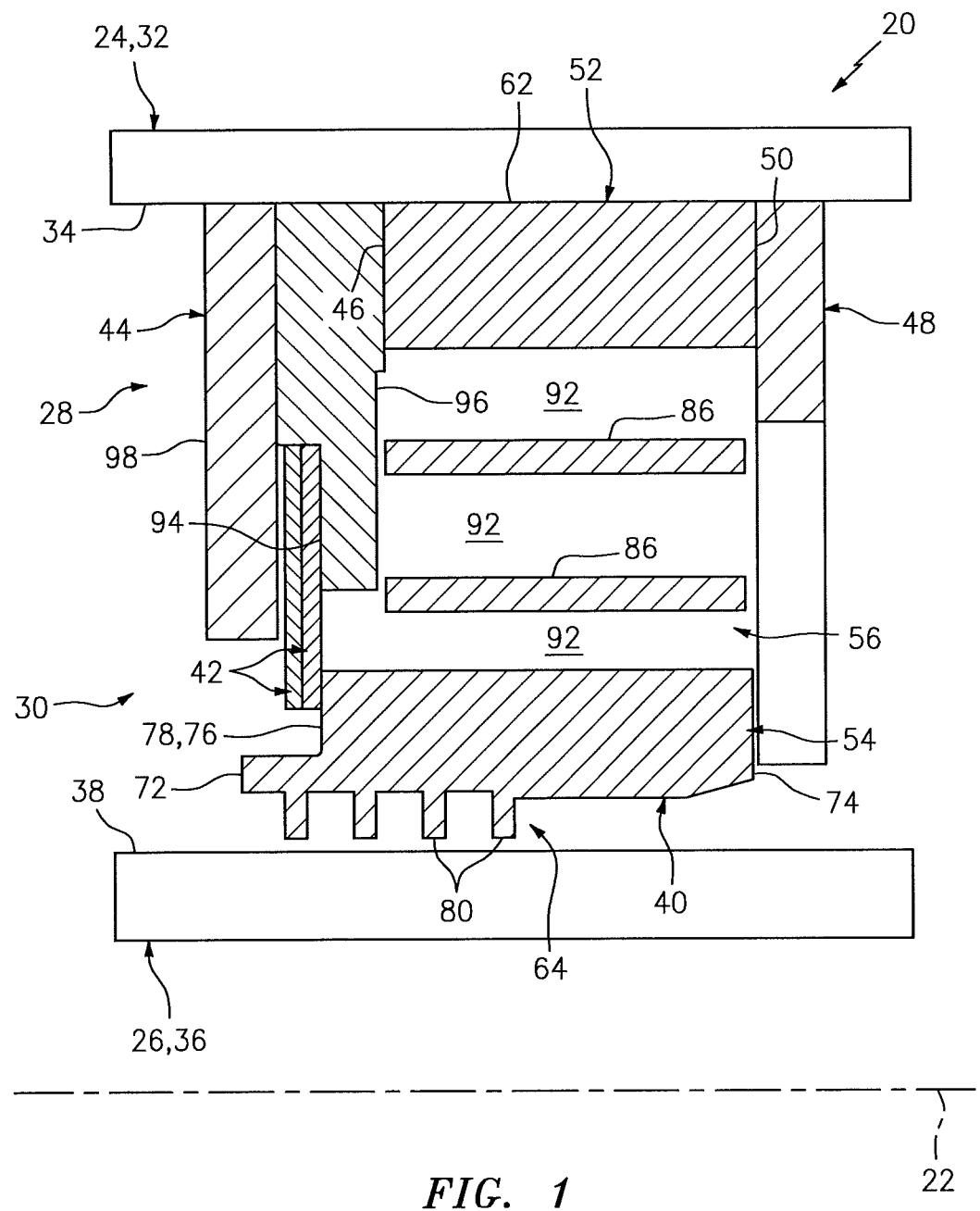
FIG. 1 is a partial side sectional illustration of an assembly for rotational equipment.

FIG. 1 illustrates an assembly 20 for rotational equipment with an axis 22 of rotation. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stationary structure and a rotor.

The assembly 20 of FIG. 1 includes a stationary structure 24, a rotor structure 26 and a non-contact seal assembly 28. The seal assembly 28 is mounted with the stationary structure 24 and configured to substantially seal an annular gap 30 between the stationary structure 24 and the rotor structure 26 as described below in further detail.

The stationary structure 24 includes a seal carrier 32. This seal carrier 32 may be a discrete, unitary annular body. Alternatively, the seal carrier 32 may be configured with another component/portion of the stationary structure 24. The seal carrier 32 has an inner radial seal carrier surface 34. This seal carrier surface 34 may be substantially cylindrical, and extends circumferentially around and faces towards the axis 22. The seal carrier surface 34 at least partially forms a bore in the stationary structure 24. This bore is sized to receive the seal assembly 28, which may be fixedly attached to the seal carrier 32 by, for example, a press fit connection between the seal assembly 28 and the seal carrier surface 34. The seal assembly 28, of course, may also or alternatively be fixedly attached to the seal carrier 32 using one or more other techniques/devices.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the axis 22. The seal land surface 38 is disposed to face towards and is axially aligned with the seal carrier surface 34. While FIG. 1 illustrates the seal land surface 38 and the seal carrier surface 34 with approximately equal axial lengths along the axis 22, the seal land surface 38 may alternatively be longer or shorter than the seal carrier surface 34 in other embodiments.

The seal assembly 28 includes a primary seal device 40 and one or more secondary seal devices 42. The seal assembly 28 also includes one or more additional components for positioning, supporting and/or mounting one or more of the seal devices with the stationary structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting a first end surface 46 of the primary seal device 40 relative to the stationary structure 24. The seal assembly 28 of FIG. 1 also includes a second ring structure 48 (e.g., a scalloped support ring/plate) configured for axially positioning and/or supporting a second end surface 50 of the primary seal device 40 relative to the stationary structure 24. However, the second ring structure 48 may be omitted where, for example, the second end surface 50 of the primary seal device 40 is abutted against another component/portion of the stationary structure 24 (e.g., an annular or castellated shoulder) or otherwise axially positioned/secured with the stationary structure 24.

Figure 2:
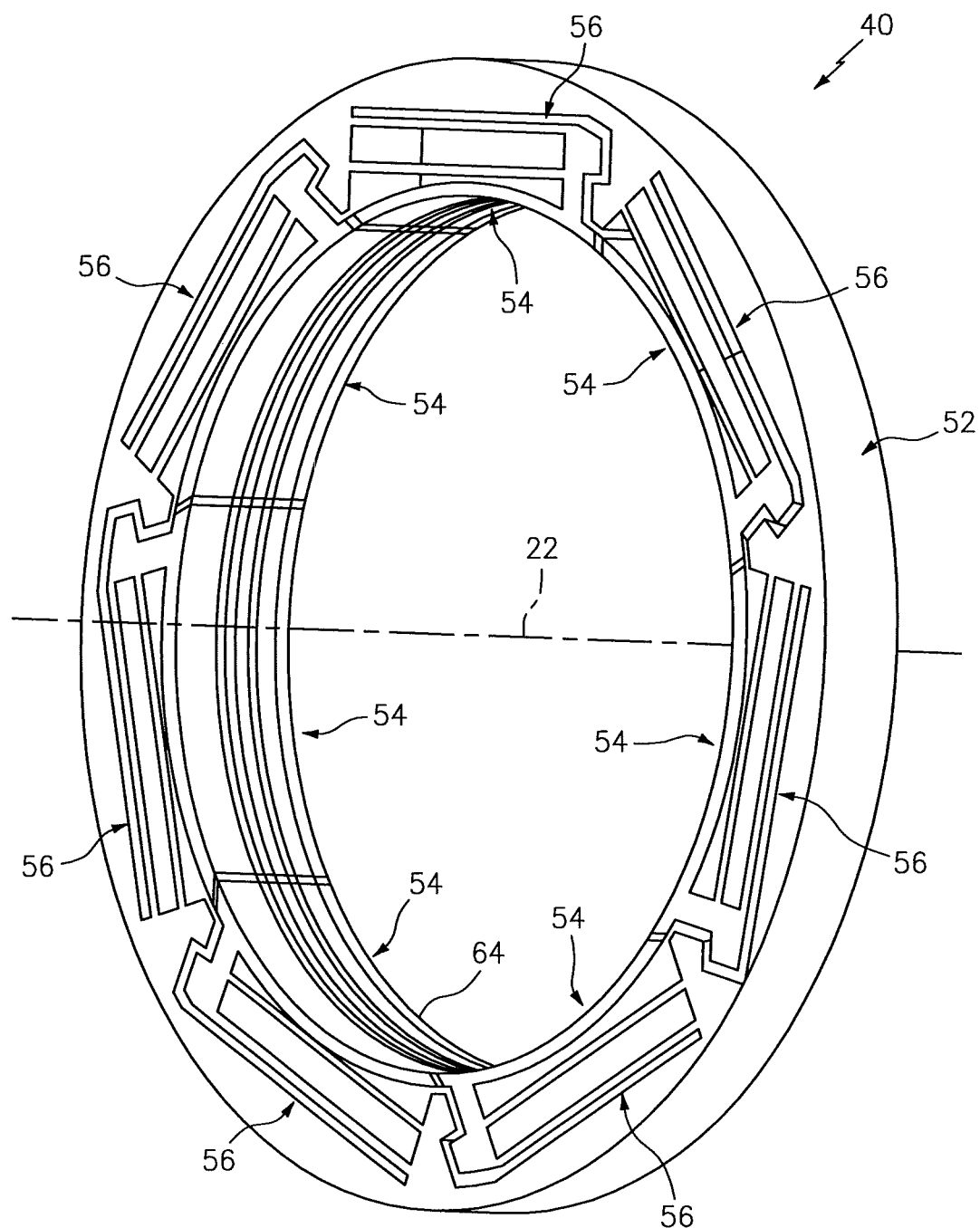
FIG. 2 is a perspective illustration of a primary seal device of a non-contact seal assembly.

Referring to FIG. 2, the primary seal device 40 is configured as an annular non-contact seal device and, more particularly, a hydrostatic non-contact seal device. An example of such a hydrostatic non-contact seal device is a HALO™ type seal; however, the primary seal device 40 of the present disclosure is not limited to the foregoing exemplary hydrostatic non-contact seal device.

Figure 3:
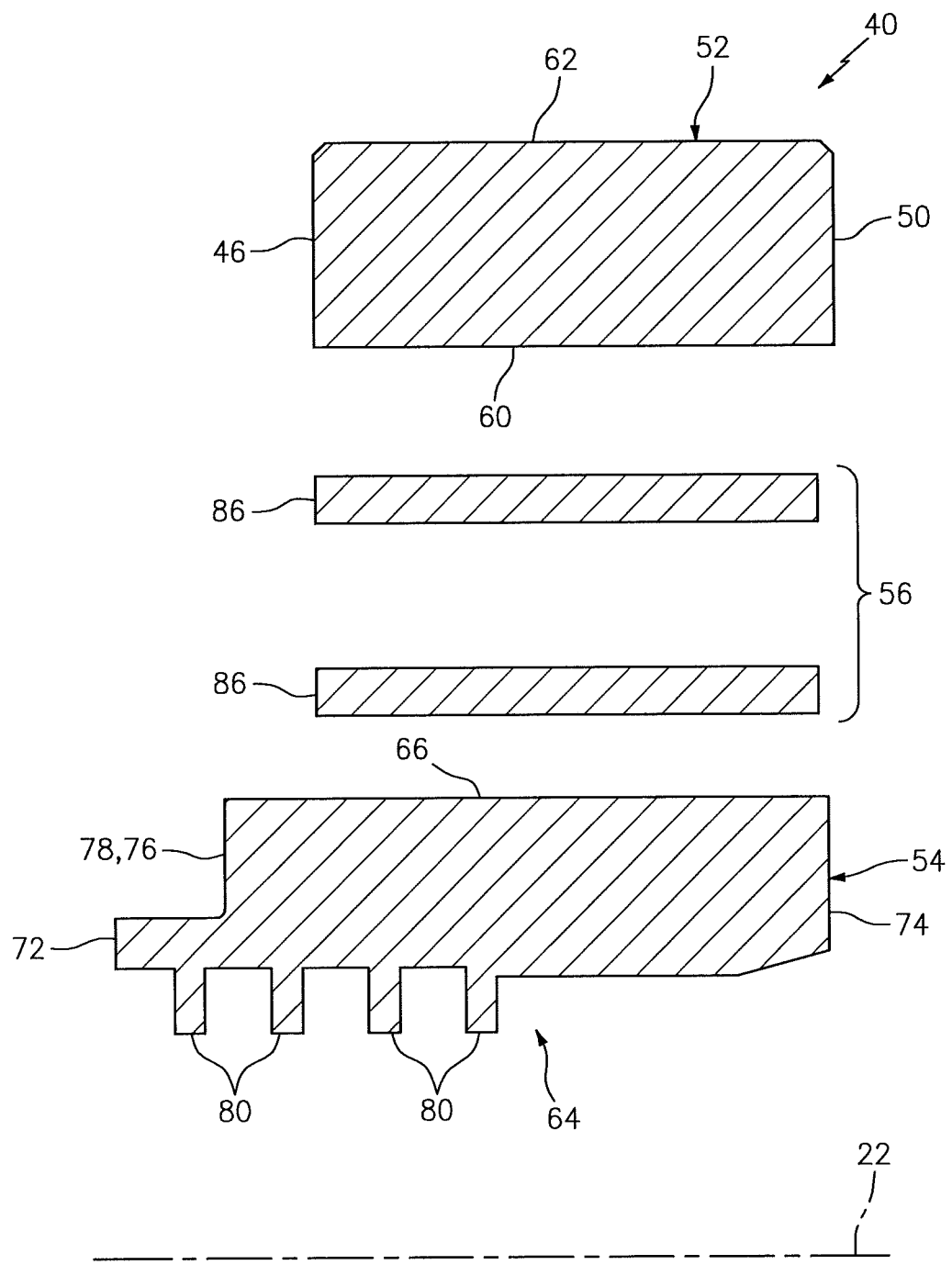
FIG. 3 is a partial side sectional illustration of the primary seal device.
Figure 4:
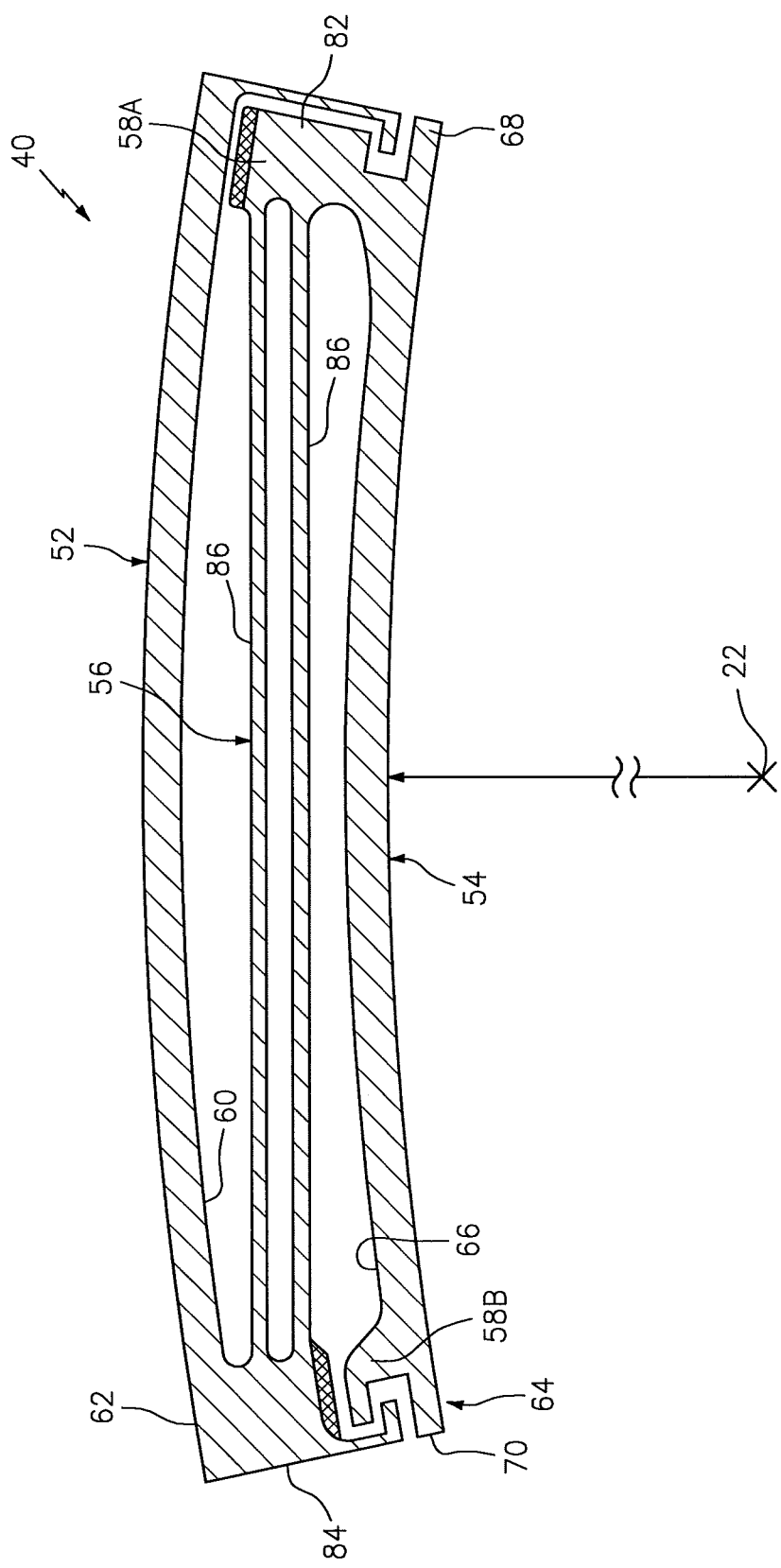
FIG. 4 is an end illustration of a section of the primary seal device.

Referring to FIGS. 3 and 4, the primary seal device 40 includes a seal base 52, a plurality of seal shoes 54, a plurality of spring elements 56. The primary seal device 40 also includes a plurality of elements 58A and 58B (generally referred to as "58") configured to restrict relative movement between the seal shoes 54 and the seal base 52 as described below in further detail.

The seal base 52 is configured as an annular full hoop body (see FIG. 2), which extends circumferentially around the axis 22. The seal base 52 is configured to circumscribe and support the seal shoes 54 as well as the spring elements 56. The seal base 52 extends axially along the axis 22 between and forms the first end surface 46 and the second end surface 50. The seal base 52 extends radially between an inner radial base side 60 and an outer radial base side 62. The outer radial base side 62 radially engages (e.g., is press fit against) the stationary structure 24 and, more particularly, the seal carrier surface 34 (see FIG. 1).

Referring to FIG. 2, the seal shoes 54 are configured as arcuate bodies and arranged circumferentially about the axis 22 in an annular array. This annular array of the seal shoes 54 extends circumferentially around the axis 22, thereby forming an inner bore at an inner radial side 64 of the primary seal device 40. As best seen in FIG. 1, the inner bore is sized to receive the seal land 36, where the rotor structure 26 projects axially through (or into) the inner bore formed by the seal shoes 54.

Referring to FIG. 4, each of the seal shoes 54 extends radially from the inner radial side 64 of the primary seal device 40 to an outer radial surface 66 of that seal shoe 54. Each of the seal shoes 54 extends circumferentially around the axis 22 between opposing first and second circumferential sides 68 and 70 of that seal shoe 54.

Referring to FIG. 3, each of the seal shoes 54 extends axially along the axis 22 between a first shoe end 72 and a second shoe end 74. The first shoe end 72 may be axially offset from and project axially away from the first end surface 46. The second shoe end 74 may be axially aligned with the second end surface 50. The seal shoes 54 of the present disclosure, however, are not limited to such exemplary relationships.

Each of the seal shoes 54 includes an arcuate end surface 76 generally at (e.g., on, adjacent or proximate) the first shoe end 72. In the array, these arcuate end surfaces 76 collectively form a generally annular (but circumferentially segmented) end surface 78 configured for sealingly engaging with the secondary seal devices 42; see FIG. 1. The seal shoes 54 of the present disclosure, however, are not limited to the foregoing exemplary configuration.

Each of the seal shoes 54 includes one or more arcuate protrusions, which collectively form one or more (e.g., a plurality of axially spaced) generally annular (e.g., circumferentially segmented) ribs 80 at the inner radial side 64. Distal inner radial ends of one or more of these ribs 80 are configured to be arranged in close proximity with (but not touch) and thereby sealingly mate with the seal land surface 38 in a non-contact manner (see FIG. 1), where the rotor structure 26 project axially through (or into) the inner bore formed by the seal shoes 54. In the embodiment of FIG. 3, each of the ribs 80 has the same radial height. In other embodiments, however, one or more of the ribs 80 may have a different radial height than at least another one of the ribs 80.

Referring to FIG. 2, the spring elements 56 are arranged circumferentially about the axis 22 in an annular array. Referring again to FIGS. 3 and 4, the spring elements 56 are also arranged radially between the seal shoes 54 and the seal base 52. Each of the spring elements 56 is configured to moveably and resiliently connect a respective one of the seal shoes 54 to the seal base 52.

The spring element 56 of FIG. 4 includes first and second mounts 82 and 84 (e.g., radial fingers/projections) and one or more spring beams 86. The first mount 82 is connected to a respective one of the seal shoes 54 at (e.g., on, adjacent or proximate) the first circumferential side 68, where the opposing second circumferential side 70 of that seal shoe 54 is free floating. The second mount 84 is connected to the seal base 52, and is generally circumferentially aligned with or near the second circumferential side 70. The second mount 84 is therefore disposed a circumferential distance from the first mount 82.

The spring beams 86 are configured as resilient, biasing members of the primary seal device 40. The spring beams 86 of FIG. 4, for example, are generally configured as cantilevered-leaf springs. These spring beams 86 are radially stacked and spaced apart with one another so as to form a four bar linkage with the first mount 82 and the second mount 84. More particularly, each of the spring beams 86 is connected to the first mount 82 and the second mount 84. Each of the spring beams 86 extends longitudinally (e.g., in a generally circumferential direction relative to the axis 22) between and to the first mount 82 and the second mount 84. The spring beams 86 of FIG. 4 may thereby laterally overlap a major circumferential portion (e.g., ~65-95%) of the respective seal shoe 54.

During operation of the primary seal device 40 of FIG. 1, rotation of the rotor structure 26 may develop aerodynamic forces and apply a fluid pressure to the seal shoes 54 causing each seal shoe 54 to respectively move radially relative to the seal land surface 38. The fluid velocity may increase as a gap between a respective seal shoe 54 and the seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 may deflect and move with the seal shoe 54 to enable provision of a primary seal of the gap between the seal land surface 38 and ribs 80 within predetermined design tolerances.

Figure 5:
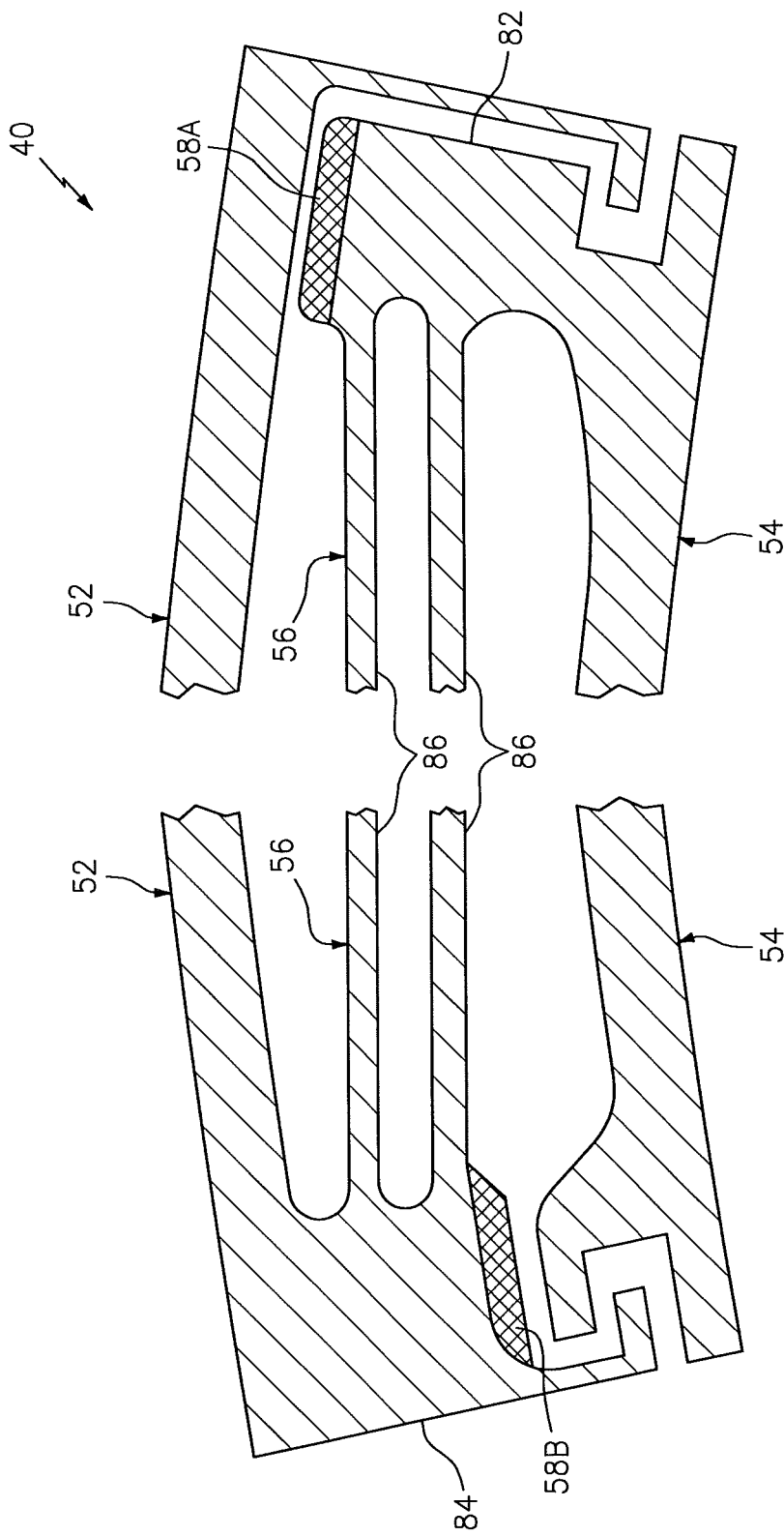
FIG. 5 is a segmented end illustration of the primary seal device section of FIG. 4 during a mode of operation.
Figure 6:
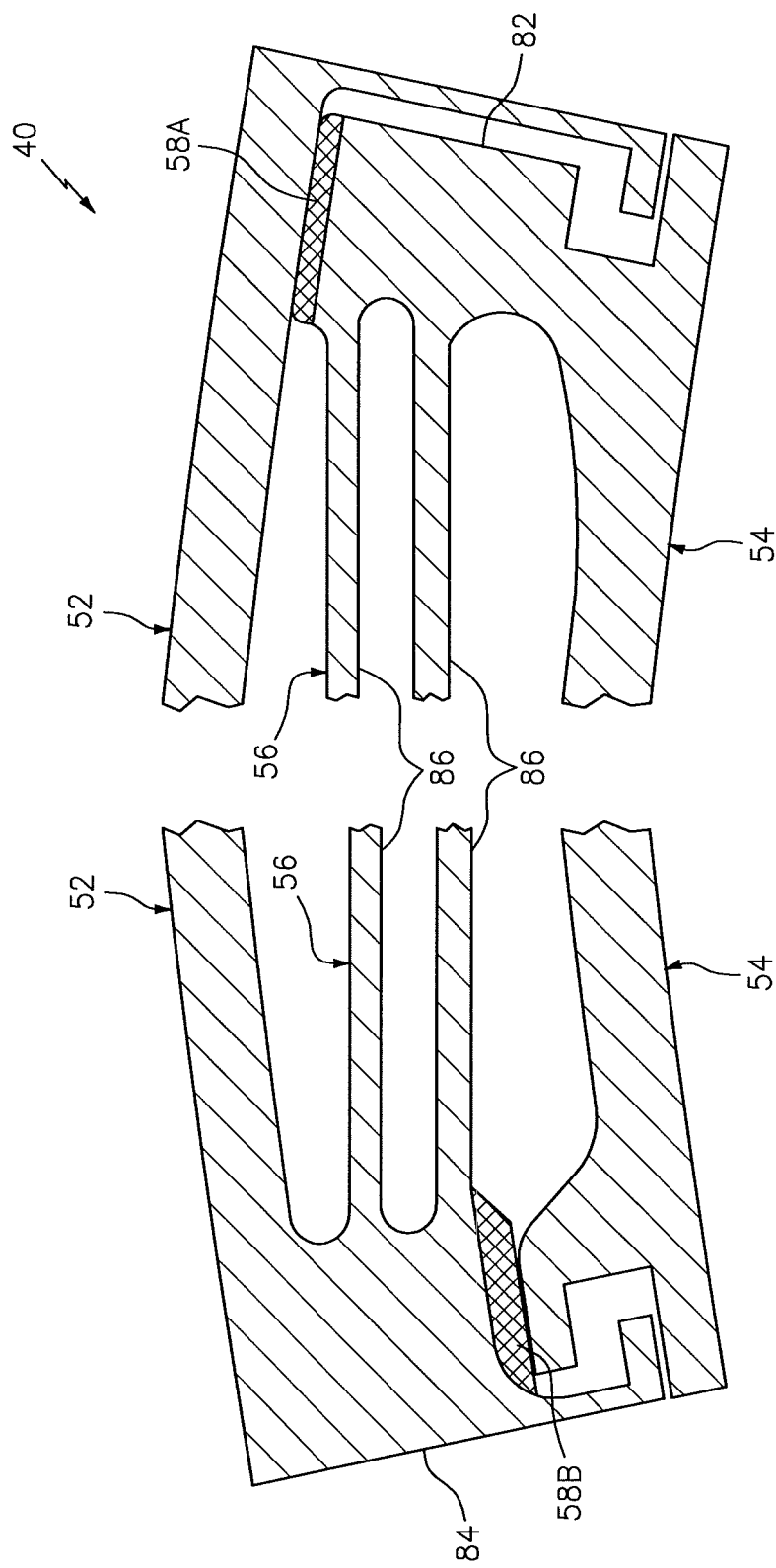
FIG. 6 is a segmented end illustration of the primary seal device section of FIG. 4 during another mode of operation.

Referring to now FIGS. 5 and 6, each of the elements 58 is configured with the primary seal device 40 to restrict the relative movement between the seal shoes 54 and the seal base 52. Each of the elements 58 in the embodiment of FIGS. 5 and 6, more particularly, is configured to restrict (e.g., limit/stop) radial outward movement of a respective one of the seal shoes 54.

The first element 58A is arranged radially between the first mount 82 and the seal base 52. The second element 58B is arranged radially between the second mount 84 and a respective one of the seal shoes 54. During nominal operation of the rotational equipment and/or the seal assembly 28, the respective seal shoe 54 may move radially up and down as described above. FIG. 5 illustrates the seal shoe 54 in a radially down position. FIG. 6 illustrates the seal shown in a radial up position. When the seal shoe 54 moves from a radial down position (e.g., the position of FIG. 5) to the radial up position of FIG. 6, the first element 58A and/or the second element 58B operate as stops/bumpers. In particular, the first element 58A radially engages (e.g., contacts) both the first mount 82 and the seal base 52. In addition to or alternatively, the second element 58B radially engages (e.g., contacts) both the second mount 84 and the seal shoe 54. As a result, the first element 58A and/or the second element 58B provide impediments to further radial outward movement of the mounts 82 and 84 and, thereby, the seal shoe 54.

Referring to FIGS. 7A and 7B, during the nominal operation, the seal shoe 54 may move radially a first distance 88 (e.g., has a first magnitude of radial movement) between a fully radial down position (see FIG. 7A) and a nominal fully radial up position (see FIGS. 6 and 7B). This radial movement of the seal shoe 54 enables the primary seal device 40 to accommodate a certain degree of movement between the stationary structure 24 and the rotor structure 26, which movement may be cause by thermal expansion and/or vibrations in the stationary structure 24 and/or the rotor structure 26.

During off-nominal operation, the movement between the stationary structure 24 and the rotor structure 26 may become so great that one or more of the seal shoes 54 may physically contact the seal land 36 (where the elements 58 are not provided). Such contact may significantly damage the respective seal shoe(s) 54 and/or the seal land 36. Therefore, to prevent or reduce the likelihood of such contact, the elements 58 are further configured to progressively restrict radial outward movement of the seal shoes 54. In particular, each element 58 may be configured to change (e.g., deform) from a nominal (e.g., undamaged and/or uncompressed) configuration shown in FIG. 8A to an off-nominal (e.g., damaged and/or compressed) configuration shown in FIG. 8B to enable an additional degree of radial seal shoe 54 travel. More particularly, during the off-nominal operation of FIG. 8B, a pressure (and/or rotor contact) force on the seal shoe 54 may be so great as to deform (e.g., crush) the seal element(s) 58 between the components 52 and 82, 54 and 84. As a result, the seal shoe 54 may move radially a second distance 90 (e.g., has a second magnitude of radial movement) between the fully radial down position and an off-nominal fully radial up position, where the second distance 90 is greater than the first distance 88.

Each of the elements 58 may have various configurations and/or constructions to provide the progressive radial movement restriction described above. In one exemplary embodiment, for example, each element 58 may be configured as an open and/or closed cell porous body (e.g., generally shown in FIG. 5); e.g., a body with a honeycomb structure. With such a configuration, each element 58 may have an undamaged and/or uncompressed and/or uncrumpled configuration during the nominal operation. Each element 58 may have a damaged and/or compressed and/or crumpled configuration during the off-nominal operation. In addition, with such a configuration, each element 58 may be configured as a replaceable component (e.g., a throwaway component) of the primary seal device 40. In other words, once an element 58 is in its off-nominal configuration, the element 58 may no longer be capable of self-returning to its nominal configuration. Therefore, that element 58 may be removed (e.g., by removing a braze/bond joint) and replacing the removed element 58 with a new/reconditioned element 58.

Each element 58 may be formed from the same material as other components of the primary seal device 40; e.g., metal. Alternatively, each element 58 may be formed from a different (e.g., less stiff, more malleable, more ductile, etc.) material from the other components of the primary seal device 40. Examples of suitable element materials include, but are not limited to, metals, composites and polymers. Of course, the elements 58 of the present disclosure are not limited to the foregoing exemplary configurations, constructions and materials.

In the embodiment of FIG. 5, the first element 58A is connected to a distal radial outer end of the first mount 82. The second element 58B is connected to a distal radial inner end of the second mount 84. For example, each element 58A, 58B may be formed integral with the respective mount 82, 84. In another example, each element 58A, 58B may be brazed, welded and/or otherwise bonded to the respective mount 82, 84. In still another example, each element 58A, 58B may be mechanically fastened to the respective mount 82, 84.

Figure 9:
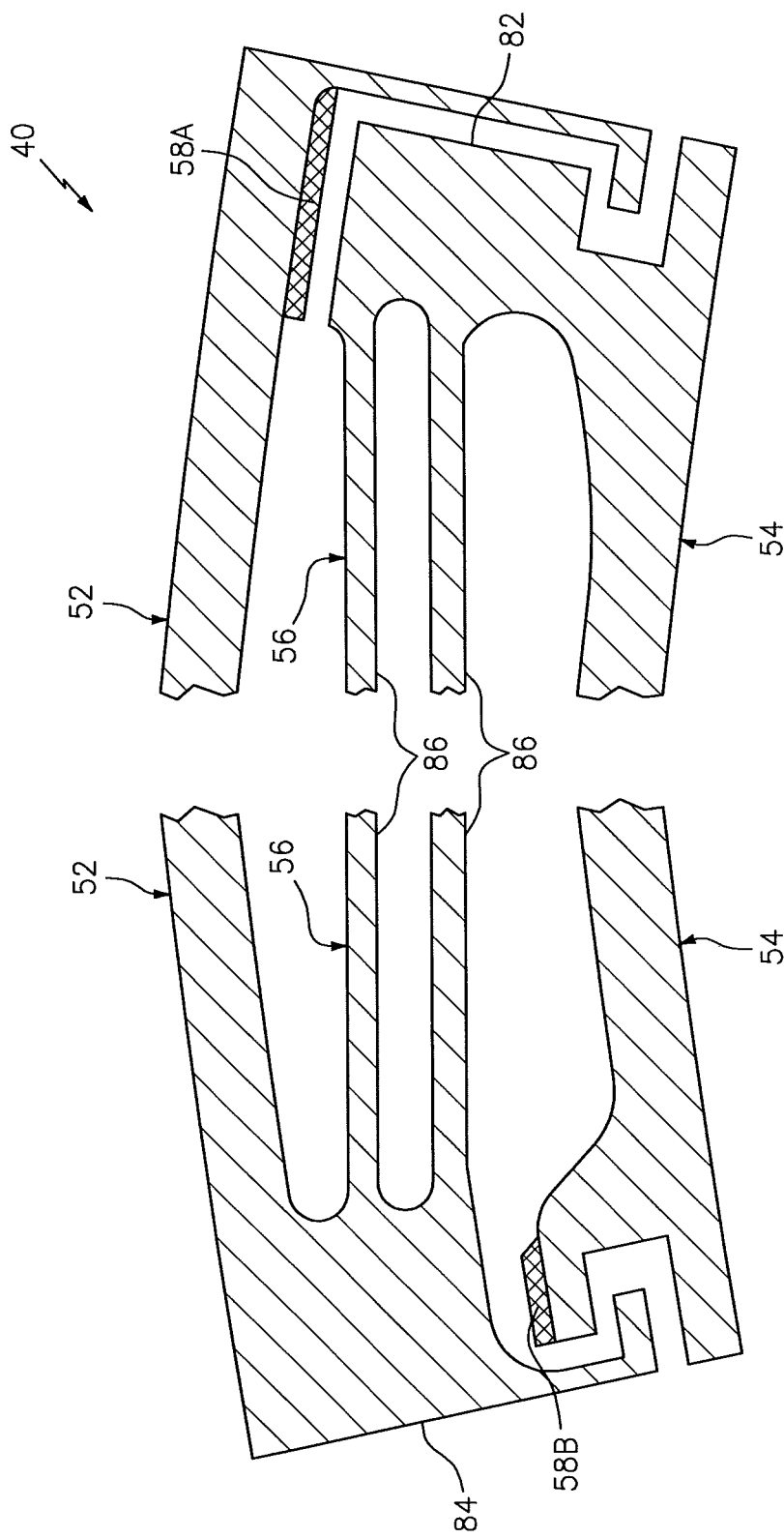
FIG. 9 is a segmented end illustration of a portion of another primary seal device.

In the embodiment of FIG. 9, the first element 58A is connected to the seal base 52. The second element 58B is connected to a respective one of the seal shoes 54. For example, each element 58A, 58B may be formed integral with the respective component 52, 54. In another example, each element 58A, 58B may be brazed, welded and/or otherwise bonded to the respective component 52, 54. In still another example, each element 58A, 58B may be mechanically fastened to the respective component 52, 54. With such an arrangement, the first element 58A is operable to alternately radially engage with and disengage from the first mount 82. Similarly, the second element 58B is operable to alternately radially engage with and disengage from the second mount 84.

Figure 10:
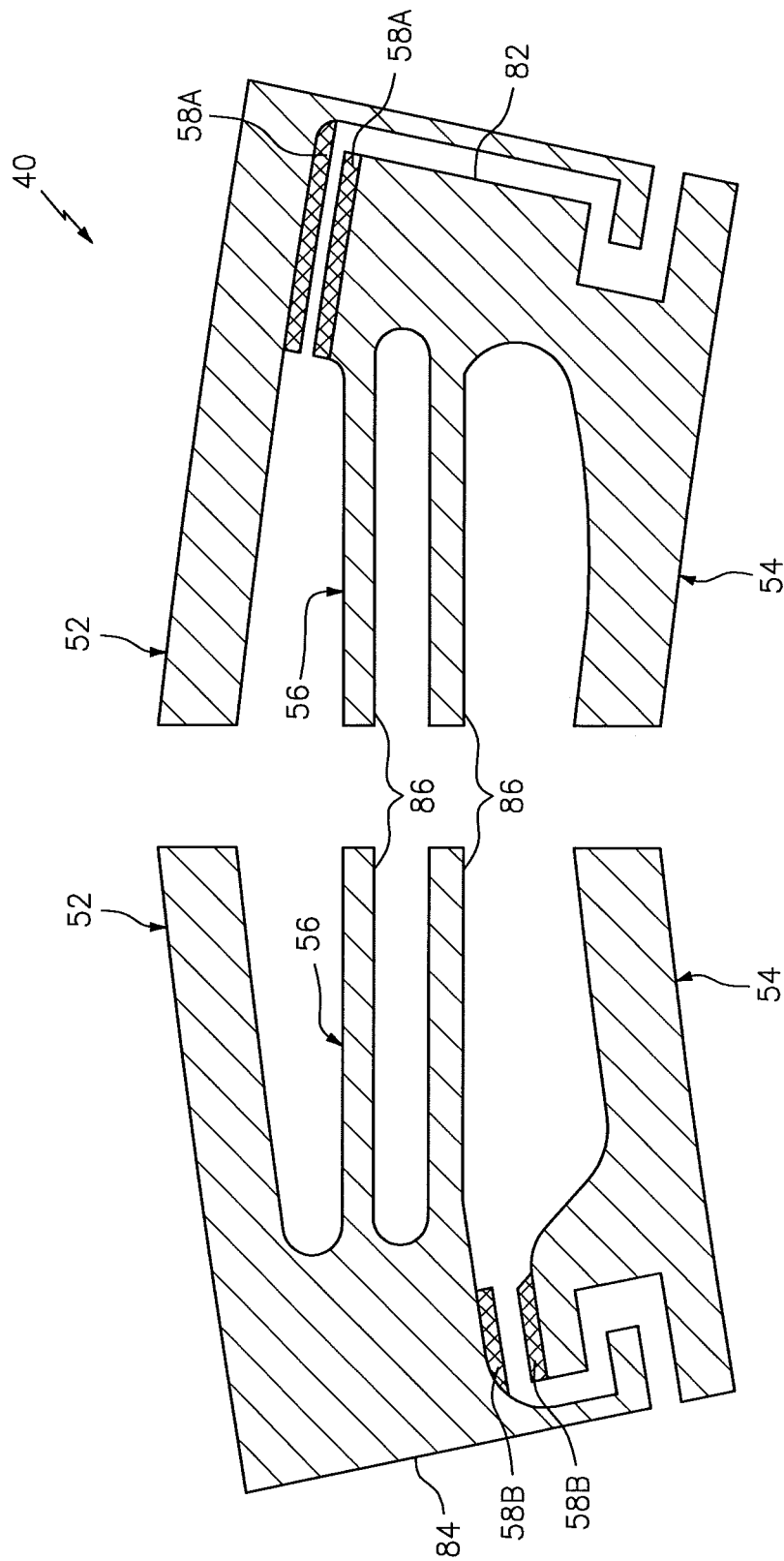
FIG. 10 is a segmented end illustration of a portion of still another primary seal device.

In the embodiments described above, each of the seal shoes 54 is associated with a pair of elements 58. However, in other embodiments, one or more of the seal shoes 54 may each be associated with the first element 58A or the second element 58B. In still other embodiments, one or more of the seal shoes 54 may each be associated with more than two elements 58. For example, referring to FIG. 10, opposing and engageable first elements 58A may be respectively connected to the first mount 82 and the seal base 52. In addition or alternatively, opposing and engageable second elements 58B may be respectively connected to both the second mount 84 and the seal shoe 54. With such an arrangement, the first element 58A is operable to alternately radially engage with and disengage from the other first element 58A. Similarly, the second element 58B is operable to alternately radially engage with and disengage from the other second element 58B.

Referring again to FIG. 1, while the primary seal device 40 described above is operable to generally seal the annular gap 30 between the stationary structure 24 and the rotor structure 26, fluid (e.g., gas) may still flow axially through passages 92 defined by the radial air gaps between the elements 58. The secondary seal devices 42 therefore are provided to seal off these passages 92 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stationary structure 24 adjacent the primary seal device 40. In this arrangement, the stack of the secondary seal devices 42 is operable to axially engage and form a seal between the end surface 78 of the array of the seal shoes 54 and an annular surface 94 of the first ring structure 44. These surfaces 78 and 94 are axially aligned with one another, which enables the stack of the secondary seal devices 42 to slide radially against, but maintain sealingly engagement with, the end surface 78 as the seal shoes 54 move radially relative to the seal land surface 38 as described above.

The first ring structure 44 may include a secondary seal device support ring 96 and a retention ring 98. The support ring 96 is configured with an annular full hoop body, which extends circumferentially around the axis 22. The support ring 96 includes the annular surface, and is disposed axially adjacent and engaged with the seal base 52.

The retention ring 98 is configured with an annular full hoop body, which extends circumferentially around the axis 22. The retention ring 98 is disposed axially adjacent and engaged with the support ring 96, thereby capturing the stack of the secondary seal devices 42 within an annular channel formed between the rings 96 and 98. The stack of the secondary seal devices 42, of course, may also or alternatively be attached to one of the rings 96 and 98 by, for example, a press fit connection and/or otherwise.

Figure 11:
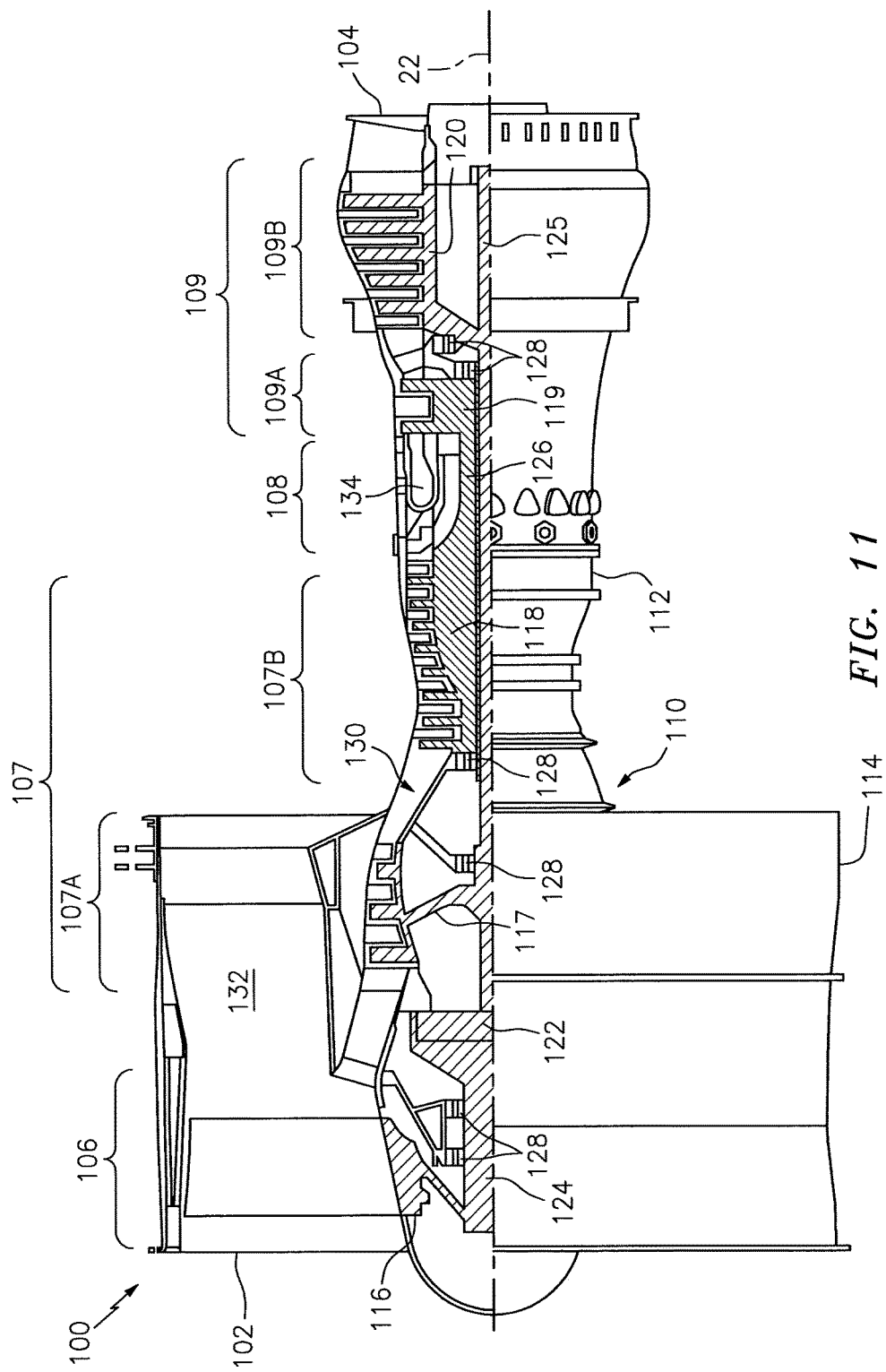
FIG. 11 is a side cutaway illustration of a geared gas turbine engine.

As described above, the assembly 20 of the present disclosure may be configured with various different types and configurations of rotational equipment. FIG. 11 illustrates one such type and configuration of the rotational equipment—a geared turbofan gas turbine engine 100. Such a turbine engine includes various stationary structures (e.g., bearing supports, hubs, cases, etc.) as well as various rotors (e.g., rotor disks, shafts, shaft assemblies, etc.) as described below, where the stationary structure 24 and the rotor structure 26 can respectively be configured as anyone of the foregoing structures in the turbine engine 100 of FIG. 11, or other structures not mentioned herein.

The turbine engine 100 of FIG. 11 extends along an axis (e.g., the axis 22 or rotation) between an upstream airflow inlet 102 and a downstream airflow exhaust 104. The turbine engine 100 includes a fan section 106, a compressor section 107, a combustor section 108 and a turbine section 109. The compressor section 107 includes a low pressure compressor (LPC) section 107A and a high pressure compressor (HPC) section 107B. The turbine section 109 includes a high pressure turbine (HPT) section 109A and a low pressure turbine (LPT) section 109B.

The engine sections 106-109 are arranged sequentially along the axis 22 within an engine housing 110. This housing 110 includes an inner case 112 (e.g., a core case) and an outer case 114 (e.g., a fan case). The inner case 112 may house one or more of the engine sections 107-109; e.g., an engine core. The outer case 114 may house at least the fan section 106.

Each of the engine sections 106, 107A, 107B, 109A and 109B includes a respective rotor 116-120. Each of these rotors 116-120 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 116 is connected to a gear train 122, for example, through a fan shaft 124. The gear train 122 and the LPC rotor 117 are connected to and driven by the LPT rotor 120 through a low speed shaft 125. The HPC rotor 118 is connected to and driven by the HPT rotor 119 through a high speed shaft 126. The shafts 124-126 are rotatably supported by a plurality of bearings 128. Each of these bearings 128 is connected to the engine housing 110 by at least one stationary structure such as, for example, an annular support strut.

During operation, air enters the turbine engine 100 through the airflow inlet 102. This air is directed through the fan section 106 and into a core gas path 130 and a bypass gas path 132. The core gas path 130 extends sequentially through the engine sections 107-109; e.g., an engine core. The air within the core gas path 130 may be referred to as "core air". The bypass gas path 132 extends through a bypass duct, which bypasses the engine core. The air within the bypass gas path 132 may be referred to as "bypass air".

The core air is compressed by the compressor rotors 117 and 118 and directed into a combustion chamber 134 of a combustor in the combustor section 108. Fuel is injected into the combustion chamber 134 and mixed with the compressed core air to provide a fuel-air mixture. This fuel air mixture is ignited and combustion products thereof flow through and sequentially cause the turbine rotors 119 and 120 to rotate. The rotation of the turbine rotors 119 and 120 respectively drive rotation of the compressor rotors 118 and 117 and, thus, compression of the air received from a core airflow inlet. The rotation of the turbine rotor 120 also drives rotation of the fan rotor 116, which propels bypass air through and out of the bypass gas path 132. The propulsion of the bypass air may account for a majority of thrust generated by the turbine engine 100, e.g., more than seventy-five percent (75%) of engine thrust. The turbine engine 100 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 11), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:
1. An assembly for rotational equipment, comprising:
a plurality of seal shoes arranged around an axis in an annular array, the seal shoes comprising a first seal shoe;
a seal base circumscribing the annular array of the seal shoes;

a first spring element radially between and connecting the first seal shoe and the seal base, the first spring element including a first mount, a second mount and a spring beam, the first mount connected to the first seal shoe, the second mount connected to the seal base, and the spring beam extending longitudinally between and connecting the first mount and the second mount; and a frangible element configured to restrict radial outward movement of the first seal shoe.

2. The assembly of claim 1, wherein the frangible element is configured to progressively restrict the radial outward movement of the first seal shoe.

3. The assembly of claim 1, wherein
the frangible element is adapted to enable a first magnitude of the radial outward movement of the first seal shoe during a first mode of operation;
the frangible element is adapted to enable a second magnitude of the radial outward movement of the first seal shoe during a second mode of operation; and
the second magnitude is greater than the first magnitude.

4. The assembly of claim 1, wherein the frangible element is configured to have
a nominal configuration during a first mode of operation; and
an off-nominal configuration, which is different from the nominal configuration, during a second mode of operation.

5. The assembly of claim 4, wherein the off-nominal configuration comprises a damaged configuration.

6. The assembly of claim 4, wherein the off-nominal configuration comprises a compressed configuration.

7. The assembly of claim 4, wherein the frangible element cannot return to the nominal configuration after being in the off-nominal configuration.

8. The assembly of claim 1, further comprising a non-contact seal assembly including the seal shoes, the seal base, the first spring element and the frangible element, wherein the frangible element is a replaceable component of the non-contact seal assembly.

9. The assembly of claim 1, further comprising a non-contact seal assembly including the seal shoes, the seal base, the first spring element and the frangible element, wherein the frangible element is brazed to another component of the non-contact seal assembly.

10. The assembly of claim 1, wherein the frangible element comprises a porous body.

11. The assembly of claim 1, wherein the frangible element is connected to a first component that comprises the first mount or the second mount.

12. The assembly of claim 11, wherein
the frangible element is operable to alternately radially engage and radially disengage a second component during nominal operation; and
the second component comprises the seal base where the first component comprises the first mount, or the second component comprises the first seal shoe where the first component comprises the second mount.

13. The assembly of claim 1, wherein the frangible element is connected to a first component that comprises the seal base or the first seal shoe.

14. The assembly of claim 13, wherein
the frangible element is operable to alternately radially engage and radially disengage a second component during nominal operation; and
the second component comprises the first mount where the first component comprises the seal base, or the second component comprises the second mount where the first component comprises the first seal shoe.

15. The assembly of claim 1, further comprising a second frangible element configured to restrict radial outward movement of the first seal shoe, wherein the second frangible element is arranged radially between the second mount and the first seal shoe, and the frangible element is arranged radially between the first mount and the seal base.

16. The assembly of claim 1, wherein the first spring element further includes a second spring beam extending longitudinally between and connected to the first mount and the second mount.

17. The assembly of claim 1, further comprising:
a ring structure axially engaged with the seal base; and
a secondary seal device mounted with the ring structure, the secondary seal device configured to substantially seal an annular gap between the ring structure and the annular array of the seal shoes.

18. The assembly of claim 1, further comprising:
a stationary structure;
a rotor structure; and
a non-contact seal assembly comprising the seal shoes, the seal base and the first spring element, the seal assembly configured to substantially seal an annular gap between the stationary structure and the rotor structure;
wherein the seal shoes circumscribe and sealingly mate with the rotor structure; and
wherein the seal base is mounted to and radially within the stationary structure.

19. An assembly for rotational equipment, comprising:
a non-contact seal assembly comprising a plurality of seal shoes, a seal base and a spring element, the seal shoes arranged around an axis in an annular array, the seal shoes comprising a first seal shoe, the seal base circumscribing the annular array of the seal shoes, and the spring element between and engaging the first seal shoe and the seal base; and
a frangible element configured to restrict radial outward movement of the first seal shoe.

20. The assembly of claim 19, further comprising:
a stationary structure; and
a rotor structure;
the non-contact seal assembly configured to substantially seal an annular gap between the stationary structure and the rotor structure;
wherein the seal shoes circumscribe and sealingly mate with the rotor structure; and
wherein the seal base is mounted to and radially within the stationary structure.

* * * * *